United States Patent
Delos Reyes et al.

(10) Patent No.: US 12,532,255 B2
(45) Date of Patent: Jan. 20, 2026

(54) SYSTEM AND METHOD FOR DYNAMIC NETWORK FUNCTION MANAGEMENT

(71) Applicant: Verizon Patent and Licensing Inc., Basking Ridge, NJ (US)

(72) Inventors: Emerando M. Delos Reyes, Pleasant Hill, CA (US); Satish S. Vasamsetti, San Francisco, CA (US); Tony Ferreira, Greenwich, CT (US); Michael Kondratiuk, Hillsborough, NJ (US)

(73) Assignee: Verizon Patent and Lic ensing Inc., Basking Ridge, NJ (US)

( * ) Notice: Subject to any disclaimer, the term of this patent is extended or adjusted under 35 U.S.C. 154(b) by 310 days.

(21) Appl. No.: 18/480,605

(22) Filed: Oct. 4, 2023

(65) Prior Publication Data

US 2025/0119822 A1 Apr. 10, 2025

(51) Int. Cl.
*H04W 48/18* (2009.01)
*H04W 60/04* (2009.01)

(52) U.S. Cl.
CPC ........... *H04W 48/18* (2013.01); *H04W 60/04* (2013.01)

(58) Field of Classification Search
CPC ...... H04W 48/18; H04W 60/04; H04W 24/02
USPC .............. 370/329; 455/410–411, 450–452.2
See application file for complete search history.

(56) References Cited

U.S. PATENT DOCUMENTS

| | | | | |
|---|---|---|---|---|
| 2020/0145833 | A1* | 5/2020 | Thakolsri | H04W 24/02 |
| 2021/0044481 | A1* | 2/2021 | Xu | H04W 72/02 |
| 2022/0030407 | A1* | 1/2022 | Bercovici | H04W 48/18 |

* cited by examiner

*Primary Examiner* — Michael Y Mapa

(57) ABSTRACT

Systems and methods enable dynamic network function management, including obtaining user input data identifying network slice provisioning parameters for a creation of a network slice in a network; sending a request for a network repository function (NRF) instance for the network slice, to an orchestrator; receiving, from the NRF instance, a verification message of the creation of the network slice; sending, to the orchestrator, a request for a creation of multiple network function (NF) instances according to the network slice provisioning parameters; receiving, from the orchestrator, a verification message of the creation of the NF instances for the network slice; receiving, from the NRF, a confirmation message of a registration of the NF instances for the network slice; sending slice-specific subscriber provisioning data to a user data instance provisioned for the network slice; and generating a network slice creation confirmation message identifying the network slice.

20 Claims, 7 Drawing Sheets

SYSTEM AND METHOD FOR DYNAMIC NETWORK FUNCTION MANAGEMENT

BACKGROUND INFORMATION

Next Generation mobile networks, such as Fifth Generation (5G) mobile networks, are being deployed as the next evolution of mobile wireless networks. 5G mobile networks are designed to increase data transfer rates, increase spectral efficiency, improve coverage, expand capacity, and reduce latency. For example, a 5G network may incorporate "network slicing" technology to increase network efficiency and performance.

Network slicing is a type of virtualized networking architecture that involves logical partitioning of a single physical network into multiple virtual networks. The partitions or "slices" of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements of the particular network slice. Network slicing may be implemented in dynamic provisioning, such that the slices of the virtualized network may change over time and may be re-customized to meet new or changing needs of applications, services, devices, customers, or operators. However, designing and managing network slices is currently labor-intensive processes involving multiple manual procedures that are prone to errors and delays.

DETAILED DESCRIPTION OF EMBODIMENTS

Figure 1:
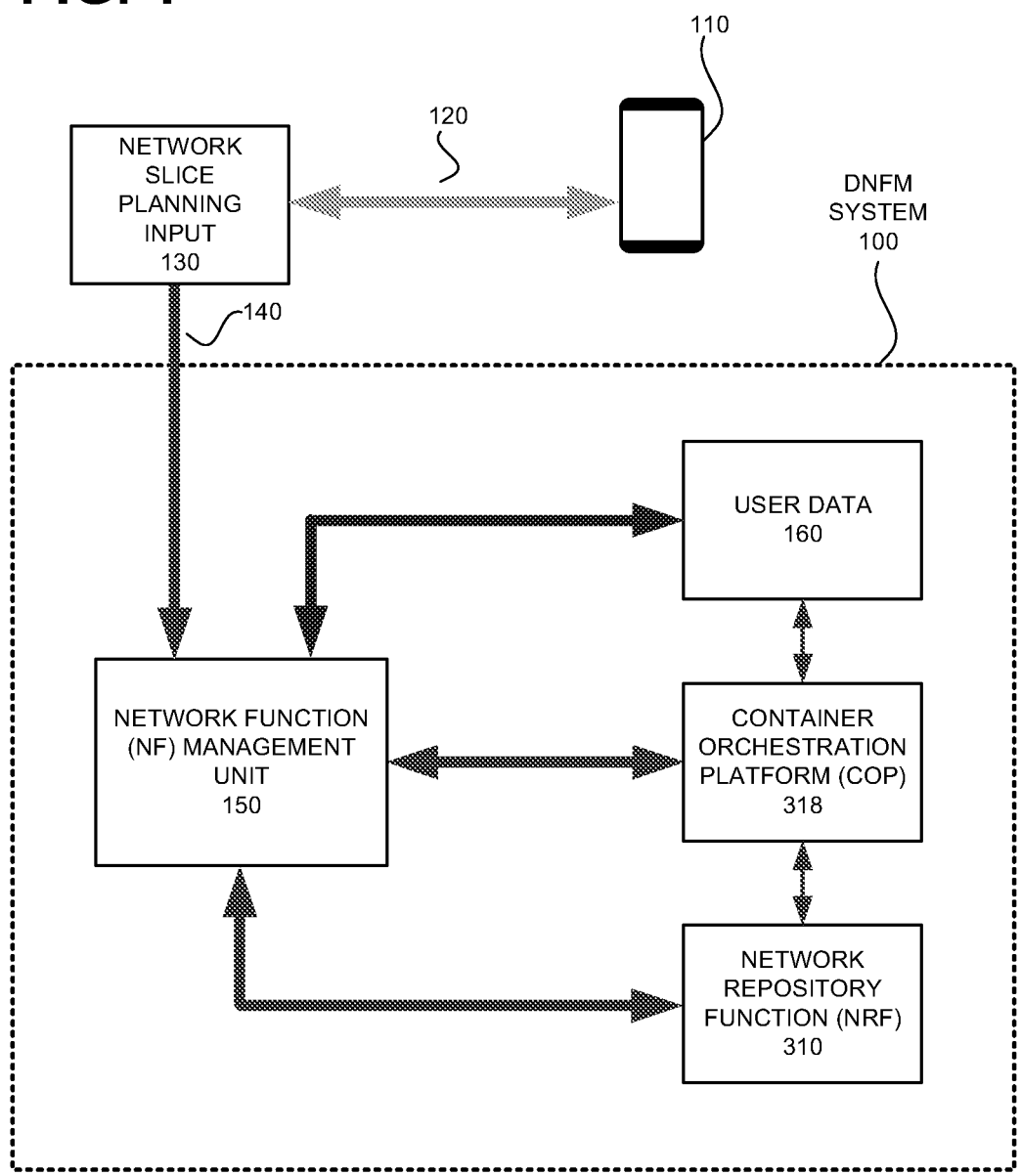
FIG. 1 illustrates an exemplary system for supporting a dynamic network function management (DNFM) service, according to an implementation.

The following detailed description refers to the accompanying drawings. The same reference numbers in different drawings may identify the same or similar elements. Also, the following detailed description does not limit the invention.

Virtualized radio access networks (RANs) and virtualized transport domains use network function virtualization (NFV) and software defined networks (SDNs) to virtualize a portion of the RANs and transport domains on standard information technology (IT) and commercial off-the-shelf (COTS) hardware. Virtualized RANs and transport domains offer a number of advantages, including a flexible and scalable architecture that enables dynamic load-balancing, intelligent traffic steering, and latency reduction using local caching. Virtualization of RANs and transport domains is particularly useful for implementing network slicing.

In Next Generation mobile networks (e.g., 5G, Sixth Generation (6G), etc.), for example, network slicing enables the creation of multiple virtual networks on top of a common infrastructure, each with its own performance, security, and reliability requirements. For example, network slicing allows 5G networks to support diverse use cases, such as enhanced mobile broadband (eMBB), ultra-reliable low-latency communication (URLLC), and massive machine-type communication (MTC). As the 5G core network (5GC) matures, demand for additional network slicing will be driven by private networks, healthcare applications, government agencies, and one-time large-scale events, and the like. Accordingly, network slicing poses ongoing challenges in terms of deployment and management, such as efficient allocation of network resources across different slices and domains, ensuring the isolation and security of each slice from other slices and external threats, and dynamically adapting the network slices to the changing demands and conditions of the users and services.

For customization and optimization of various services and applications, each network slice needs its own policies, configurations, and performance requirements, without interference from other network slices. Depending on the type of network slice to be deployed, the number and size of network functions (NFs) could vary significantly, and each has to be configured and tested individually. Another challenge is to manage the complexity and diversity of network services in 5GCs, since network slices may involve different technologies, such as virtualization, orchestration, and automation. Moreover, a network slice may need to dynamically adapt to changing demands, and conditions, such as traffic load, user mobility, and/or service quality.

Systems and methods described herein relate to dynamic management of the creation and deletion of NF instances for network slice provisioning services. The systems and methods support automation of network slicing design and deployment. Modular parts or segments of core network infrastructure may be modified and assembled to meet a user's particular network slice requirements. A slice planning tool (e.g., operating on a network device or computing device) may store a set of differently configured NFs for associated modular parts or segments of a network slice (referred to herein as slice segments) in a data transport network and may identify customer parameters for a new slice. User profiles may govern selection of the dedicated NFs for the different slice segments and the selected NFs may be modified to meet user requirements and conform to configurations of another segment in the user's slice. Once each slice segment is configured, the slice planning tool may assemble the individual segment designs into, for example, a network slice design for deployment and its eventual removal.

FIG. 1 illustrates an overview of a system for supporting dynamic network function management (DNFM) 100, according to one implementation. As shown, DNFM system 100 may receive a network slice provisioning request 140—identifying a particular user profile associated with a UE device 110 establishing a signaling path 120—including a network slice planning input 130. Network slice planning input 130 may be generated by an operator as a result of UE device 110 establishing signaling path 120 through multiple network devices and/or components and sending control signals via path 120. One of the signals may include a request to establish a session. Although not shown, transmitting such a request over path 120 may result in exchanges and forwarding of additional control messages between various network components.

As further shown, DNFM system 100 may include an NF management unit 150, a network repository function (NRF) 310, a container orchestration platform (COP) 318, and a user data component 160. These components will be described in greater detail with reference to FIGS. 2-6. Regarding FIG. 1, when NF management unit 150 receives network slice provisioning request 140, NF management unit 150 generates a request for an NRF instance and sends the request to COP 318. In some embodiments, COP 318 may include Kubernetes (k8s), Amazon web services (AWS), Nomad, Iron Worker, Docker Swarm, Amazon Elastic Container Service (ECS), Helios, APACHE MESOS, RED HAT OpenShift Container Platform, Cloudify, and/or the like. COP 318 may initiate creation of NRF 310 for a new network slice. In some embodiments, user data 160 may include a unified data repository (UDR) device 314 and/or a unified data management (UDM) device 316 (not illustrated in FIG. 1). User data 160 may query NRF 310 for new instances of NFs, such as a user plane function (UPF), an access and management mobility function (AMF), a session management function (SMF), a network slice selection function (NSSF), and/or a policy control function (PCF) serving the newly provisioned network slice. Details of DNFM system 100 and methods associated with DNFM system 100 are described in greater detail below.

Dynamic network slice design and creation, supported by DNFM system 100, may occur in many situations. For example, assume that UE 110 switches its profile to connect to an enterprise network slice for security reasons. In this scenario, DNFM system 100 may dynamically trigger the creation of the enterprise network slice, if not already provisioned in the network. In another example, DNFM system 100 may allow application servers to have UEs 110 access services provided only by a dedicated network slice that fits the service profile specified by the application servers. DNFM system 100 may create the network slice and add a Single Network Slice Selection Assistance Information (S-NSSAI) of the created network slice to the subscription data. Once the subscription data is updated with the S-NSSAI, UE 110 may access the newly created network slice to receive the services.

Figure 2:
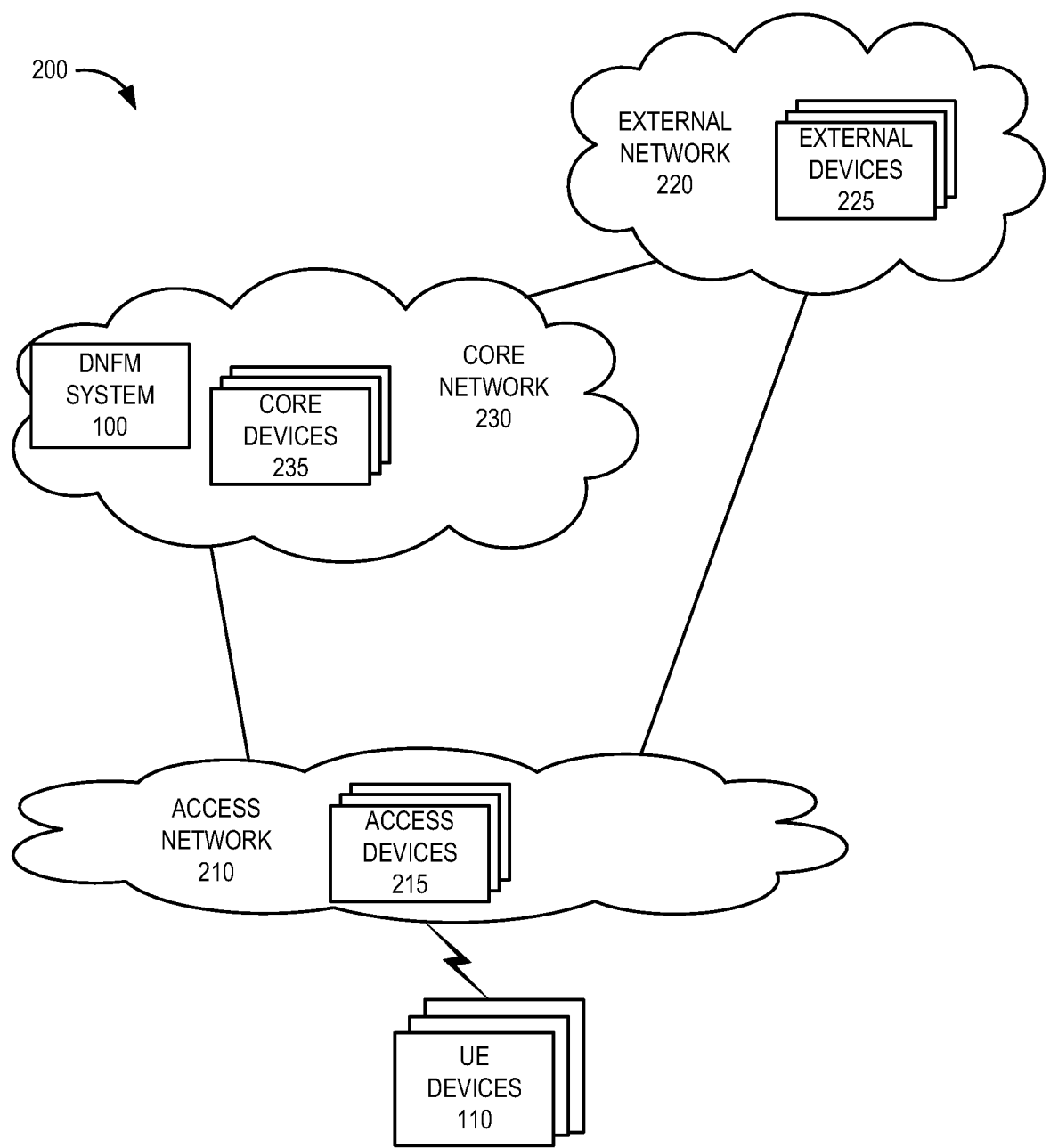
FIG. 2 illustrates an overview an exemplary network environment in which the systems and methods for supporting DNFM may be implemented.

FIG. 2 is a diagram illustrating an example environment 200 in which an embodiment of the DNFM service may be implemented. As illustrated, environment 200 includes an access network 210, an external network 220, and a core network 230. Access network 210 includes access devices 215 (also referred to individually or generally as access device 215). External network 220 includes external devices 225 (also referred to individually or generally as external device 225). Core network 230 includes core devices 235 (also referred to individually or generally as core device 235). Environment 200 further includes UE devices 110 (also referred to individually or generally as UE 110).

The number, type, and arrangement of networks illustrated in environment 200 are examples. In other embodiments, environment 200 may include fewer networks, additional networks, and/or different networks. For example, in other embodiments, other networks not illustrated in FIG. 2 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of UE devices 110 are examples. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 200 includes communication links between the networks, between the network devices, and between UEs 110 and the network/network devices. Environment 200 may be implemented to include wired, optical, and/or wireless communication links. A connection via a communication link may be direct or indirect. For example, an indirect connection may involve an intermediary device and/or an intermediary network not illustrated in FIG. 2. A direct connection may not involve an intermediary device and/or an intermediary network. The number, type, and arrangement of communication links illustrated in environment 200 are examples.

Environment 200 may include various planes of communication including, for example, a control plane, a user plane, a service plane, and/or a network management plane. Environment 200 may include other types of planes of communication. Additionally, an interface of a network device may be modified (e.g., relative to an interface defined by a standards body, such as 3GPP, 3GPP2, ITU, ETSI, GSMA, or the like) or a new interface of the network device may be provided in order to support the communication (e.g., transmission and reception of messages, information elements (IE), attribute value pairs (AVPs), objects, parameters, or other form of information) between network devices and the DNFM service logic of the network device, as described herein. According to various implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 210 may include one or multiple networks of one or multiple types and technologies. For example, access network 210 may be implemented to include a 5G RAN, a future generation RAN (e.g., a sixth generation (6G) RAN, a seventh generation (7G) RAN, or a subsequent generation RAN). Access network 210 may also include a legacy RAN (e.g., a third generation (3G) RAN, a 4G or 4.5 RAN, etc.). Access network 210 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 210, external network 220, and/or core network 230.

Access network 210 may include different and multiple functional splitting, such as options 1, 2, 3, 4, 5, 6, 7, or 8 that relate to combinations of access network 210 and core network 230 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

According to some embodiments, access network 210 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various embodiments, access network 210 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, higher than mm wave), and/or other attributes or technologies used for radio communication. Additionally, or alternatively, according to some embodiments, access network 210 may be implemented to include various wired and/or optical architectures for wired and/or optical access services.

Depending on the implementation, access network 210 may include one or multiple types of network devices, such as access devices 215. For example, access device 215 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 215 may include a wired and/or optical device (e.g., modem, wired access point, optical access point, ethernet device, etc.) that provides network access. According to some implementations, access device 215 may include a combined functionality of multiple RATs (e.g., 4G and 5G functionality, 5G and 5.5G functionality, 5G and 6G functionality, etc.) via soft and hard bonding based on demands and needs. According to some implementations, access device 215 may include an integrated functionality, such as a CU-CP and a CU-UP, or other integrations of split RAN nodes. Access device 215 may be an indoor device or an outdoor device. Access device 215 may include a controller device. For example, access device 215 may include a RAN intelligent controller (RIC).

According to various implementations, access device 215 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 215 may provide a wireless access service at a cell, a sector, a sub-sector, carrier, and/or other configurable level.

External network 220 may include one or multiple networks of one or multiple types and technologies. For example, external network 220 may be implemented to include a service or an application layer network, a cloud network, a private network, a public network, a multi-access edge computing (MEC) network, a fog network, the Internet, a packet data network (PDN), a service provider network, the world wide web, an Internet Protocol Multimedia Subsystem (IMS) network, a Rich Communication Service (RCS) network, an SDN, a virtual network, a data center, or other type of network that may provide access to and may host a UE device application, service, or asset (application service).

Depending on the implementation, external network 220 may include various network devices such as external devices 225. For example, external devices 225 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.).

External devices 225 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 230 may include one or multiple networks of one or multiple network types and technologies. Core network 230 may include a complementary network of access network 210. For example, core network 230 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation, core network 230 may include various types of network devices that are illustrated in FIG. 2 as core devices 235. For example, core devices 235 may include a UPF, a Non-3GPP Interworking Function (N3IWF), an AMF, an SMF, a UDM device, a UDR device, an authentication server function (AUSF), an NSSF, an NRF, a PCF, a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a GPRS support node (GGSN), a home subscriber server (HSS), an authentication, authorization, and accounting (AAA) server, a policy and charging rules function (PCRF), a policy and charging enforcement function (PCEF), and/or a charging system (CS). According to other implementations, core devices 235 may include additional, different, and/or fewer network devices than those described. For example, core devices 235 may include a non-standard or a proprietary network device, and/or another type of network device that may be well-known but not particularly mentioned herein. Core devices 235 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to an embodiment, at least a portion of core devices 235 may include DNFM service logic and an interface that supports the DNFM service, as described herein. According to some embodiments, other network devices of other types of networks (e.g., access network 210, external network 220, an X-haul network, or another type of network) may include DNFM service logic and an interface (e.g., service-based interface) that supports the DNFM service, as described herein. According to other embodiments, core devices 235 may include one or more of DNFM system 100 and/or network slices. As briefly described above, DNFM system 100 may provide dynamic network slice design and creation mechanisms. Additional details are provided below. In one implementation, a network slice may be end-to-end (E2E) and may encompass access network 210 and/or external network 220. That is, access network 210, core network 230, and external network 220 may include multiple instances of network slices.

Depending on the architecture, some network slices may be created dynamically and/or pre-allocated for particular uses and services. In some implementations, an application or AF in core network 230, external network 220, or an edge network (e.g., network at the edge of access network 210) may sponsor a particular network slice, data on the network slice, and/or a network service. Each network slice may be associated with an identifier, herein referred to as an S-NSSAI. For each UE 110 that wishes to access a particular network slice, the subscription data for the UE 110 (stored in core network 230, for example), needs to include the corresponding S-NSSAI that identifies the network slice.

UEs 110 may include a device that may have computational and/or communication capabilities (e.g., wireless, wired, optical, etc.). UE 110 may be implemented as a mobile device, a portable device, a stationary device (e.g., a non-mobile device and/or a non-portable device), a device operated by a user, or a device not operated by a user. For example, UE 110 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, or other type of wireless device (e.g., other type of UE device). UE 110 may be configured to execute various types of software (e.g., applications, programs, etc.). The number and the types of software may vary among UEs 110.

UE device 110 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, UE device 110 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of UE device 110 may vary among UE devices 110.

For certain applications, UE device 110 may store UE Route Selection Policies (URSPs). The URSP framework for a 5G System provides traffic steering rules for UE devices and enables a UE device to determine how a certain application should be handled in the context of traffic routing to an appropriate network slice. According to implementations described herein, URSP may include a preemption policy for network slices to enable device-side monitoring and prioritization for network slices. URSPs may be stored, for example, in a subscriber identity module (SIM) or modem of UE device 110.

Depending on the implementation, network environment 200 may include additional networks and components than those illustrated in FIG. 2. However, for simplicity, FIG. 2 does not show all components that may be included in network environment 200 (e.g., routers, bridges, wireless access point, additional UE devices, switches, etc.).

Figure 3:
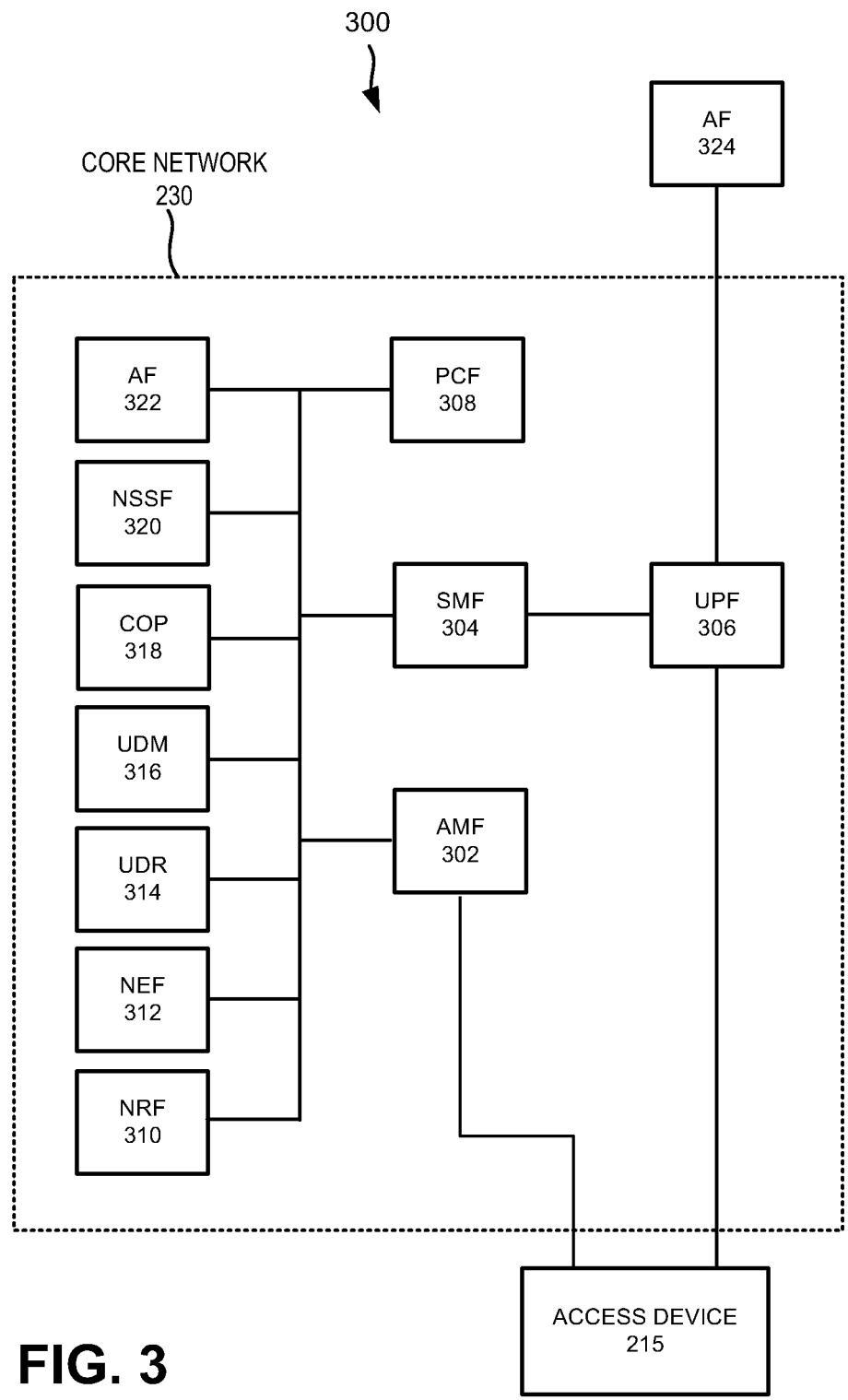
FIG. 3 depicts exemplary components of a portion of the exemplary network, according to an implementation.

FIG. 3 depicts exemplary components of a portion 300 of network environment 200 according to an implementation. As shown, portion 300 may include access device 215 (described above with respect to FIG. 2), an application function (AF) 324, and a portion of core network 220. AF 324 may be one of what are referred to as an NF. AF 324 may provide an AF that belongs to a third party (i.e., an entity different from a service provider) and provides services to UEs 110 via access network 210, core network 230, and/or external network 220. When UE 110 connects to AF 324 in network environment 200, AF 324 may send a message to an NF within core network 220 (e.g., NEF 312). For example, AF 324 may signal a session to NEF 312.

In FIG. 3, core network 230 comprises, in addition to other components described with reference to FIG. 2, multiple NFs that are implemented in accordance with Service Based Architecture (SBA), either as physical devices or virtual components (e.g., a container or a virtual machine). Each NF includes a particular network functionality and may act as an NF service consumer or an NF service producer. An NF service consumer receives services from a NF service producer, which provides services to other NFs.

As further shown, the NFs in core network 230 include an AMF 302, an SMF 304, a UPF 306, a PCF 308, an NRF 310, a NEF 312, a UDR 314, a UDM 316, a COP 318, an NSSF 320, and an AF 322.

AMF 302 may perform one or more of registration management, connection management, reachability management, mobility management, packet intercepts, SMS transport between UE 110 and an SMS function, session management message transport between UE 110 and SMF 304, access authentication and authorization, location services management, support of non-3GPP access networks, and/or other types of management processes. AMF 302 may page UE 110 based on mobility category information associated with UE 110 obtained from UDM 316. In some implementations, AMF 302 may implement some or all of the functionality of managing RAN slices in access devices 215.

SMF 304 may perform one or more of session establishment, modification and/or release; IP address allocation and management; Dynamic Host Configuration Protocol (DHCP) functions; selection and control of UPF 306; configuring traffic steering at UPF 306 to guide traffic to the correct destination; terminating interfaces toward PCF 308; packet intercepts; charge data collection; support charging interfaces; control and coordinate charging data collection; terminating session management parts of non-access stratum (NAS) messages; downlink of data notification; manage roaming functionality; and/or other types of control plane (CP) processes for managing user plane (UP) data.

UPF 306 may perform one or more of maintaining an anchor point for intra/inter-RAT mobility (e.g., mobility across different radio access technologies; maintaining an external Packet Data Unit (PDU) point of interconnect to a data network (e.g., an IP network, etc.); packet routing and forwarding; enforcing the user plane part of policy rules; packet inspection; packet intercept; traffic usage reporting; Quality-of-Service (QOS) handling in the user plane; uplink of traffic verification; transport level packet marking; downlink packet buffering; sending and forwarding an "end marker" to a RAN node; and/or other types of user plane processes.

PCF 308 may support policies to control network behavior, provide policy rules to CP functions (e.g., to SMF 304), access subscription information relevant to policy decisions, perform policy decisions, and/or perform other types of processes associated with policy enforcement.

NRF 310 may serve as a registrar for all NFs and allow the NFs to register and discover each other via a standards-based application programming interface (API). In some embodiments, NRF 310 may maintain an updated repository of all the 5GC elements, and identify the status of the services provided by each of the NFs that are anticipated to be instantiated, scaled and terminated without manual intervention.

NEF 312 may expose capabilities and events to other NFs, including third party NFs AFs, edge computing NFs, and/or other types of NFs. Furthermore, NEF 312 may secure provisioning of information from external applications to external network 220, translate information between core network 230 and devices/networks external to access network 210, support a Packet Flow Description (PFD) function, and/or perform other types of network exposure functions.

UDR 314 may store subscriber/subscription data (e.g., subscriber/subscription profile) associated with UEs 110, modify subscriber data, and/or delete subscriber data. UDM 316 may maintain subscription information for UE 110; manage subscriptions; generate authentication credentials; handle user identification; perform access authorization based on subscription data; perform network function registration management; maintain service and/or session continuity by maintaining assignment of SMF 304 for ongoing sessions; support SMS delivery, support lawful packet intercept functionality; and/or perform other processes associated with managing user data. For example, UDM 314 may store subscription profiles that include authentication, access, and/or authorization information. Each subscription profile may include information identifying UE 110; authentication and/or authorization information for UE 110; information identifying services enabled and/or authorized for UE 110; device group membership information for UE 110; and/or other types of information associated with UE 110. Furthermore, the subscription profile may include mobility category information associated with UE 110.

COP 318 may automate NF deployment, scaling, and/or management. The management may include instantiation, removal, and/or modification of network slices based on specifications and/or service profiles. In some embodiments, COP 318 may organize containers into groups of pods, to ease the creation of NFs.

NSSF 320 may obtain a S-NSSAI for newly created network slices and store the S-NSSAI. NSSF 320 may select a set of network slice instances to serve a particular UE 110, determine NSSAI, determine a particular AMF 302 to serve a particular UE 110, and/or perform other types of processes associated with network slice selection or management.

AF 322 may provide services associated with a particular application, such as, for example, application on traffic routing, accessing NEF 312, interacting with a policy framework for policy control, and/or other types of applications. In contrast to AF 324, AF 322 may belong to the provider network and may be included in core network 230.

In addition to the functionalities described above, the components 302-324 may include additional capabilities. Such capabilities may be implemented through modification of standard interfaces and/or addition of new interfaces for interacting with various functions. Some of these additional capabilities for supporting dynamic network slice design and creation are described below with reference to FIGS. 4A and 4B.

Figure 4A:
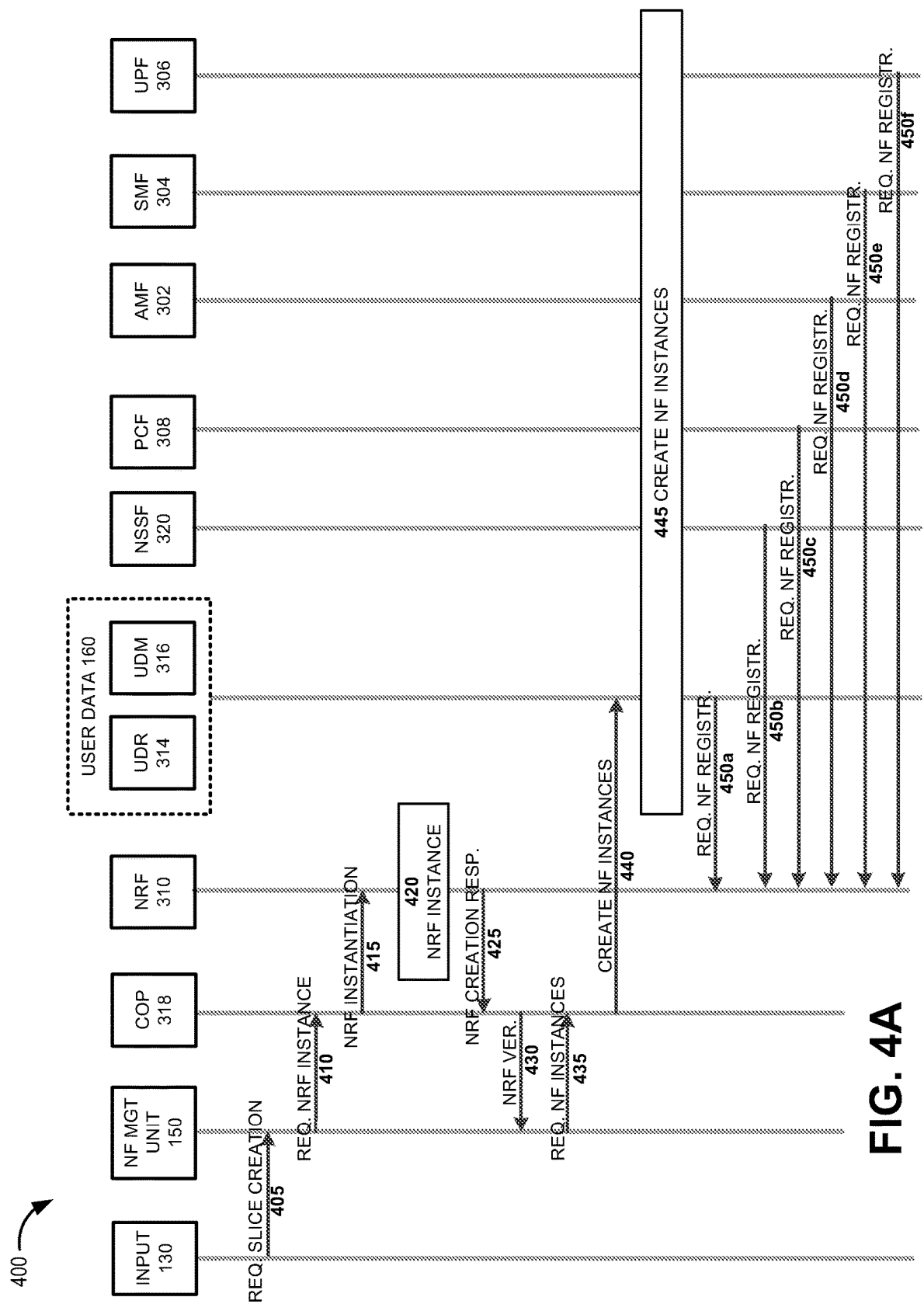
FIGS. 4A and 4B show signaling diagrams of an exemplary process that is associated with the systems and methods for supporting dynamic NF design and creation, according to an implementation.
Figure 4B:
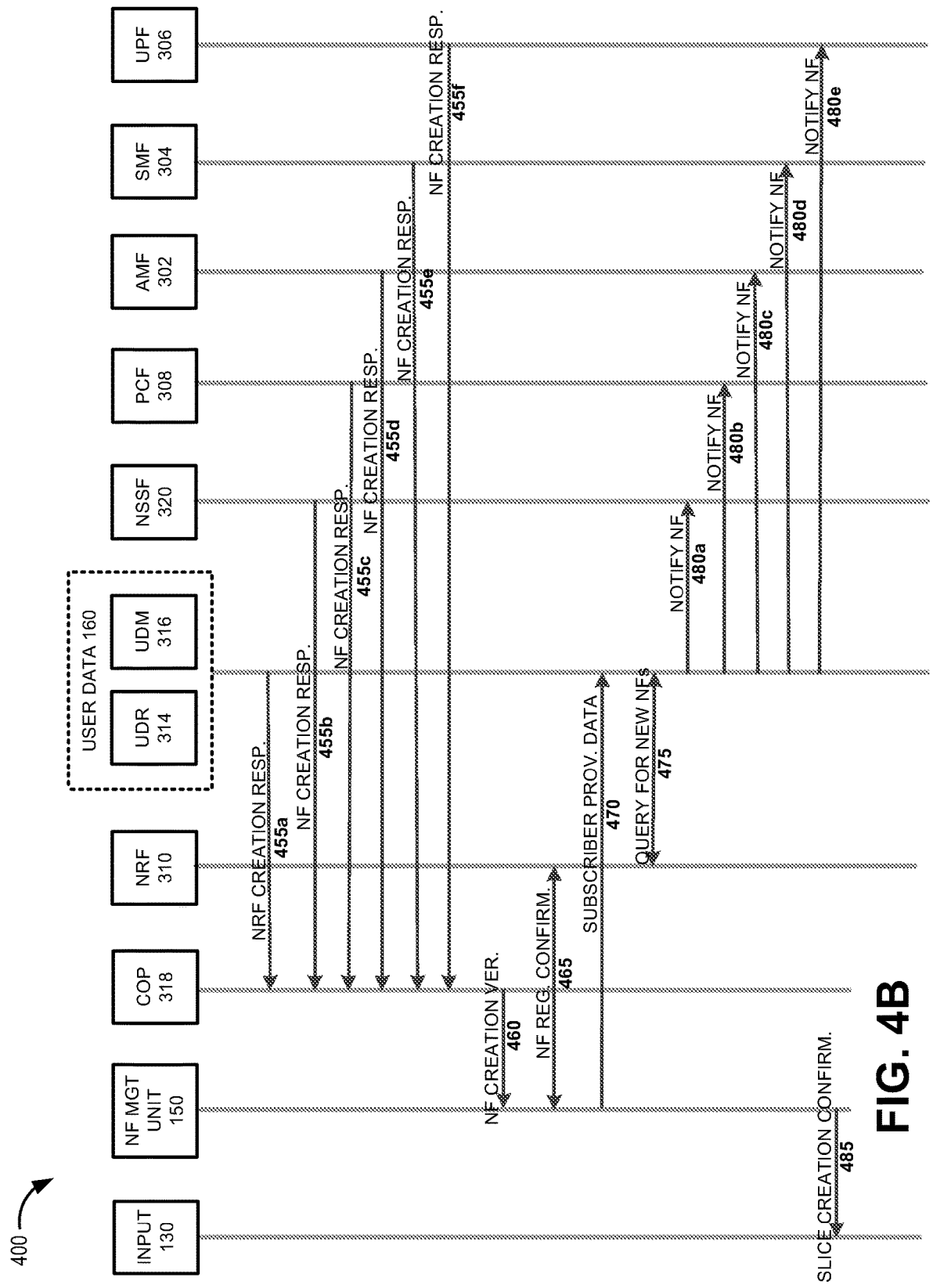

FIGS. 4A and 4B show a signaling diagram of an exemplary process 400 that is associated with the systems and methods for supporting dynamic network slice design and creation, according to an implementation, and which may be performed by one or more components 302-324. Although additional network components may perform part of process 400, these components are not shown in FIGS. 4A and 4B. Also, FIGS. 4A and 4B are not intended to illustrate every signal/message exchanged or task performed by the network components during process 400. The signaling may be in the form of a call via an interface, such as a service-based interface (SBI).

As shown, process 400 may include an operator creating and sending input 130 including a request for network slice creation 405 that may include network slice provisioning parameters corresponding to an AF service/service profile, to a network function, NF management unit 150. The network slice provisioning parameters may include information for the newly requested network slice, such as an S-NNSAI, URSPs, an access point name (APN), a list of requested NFs, a forecasted number of subscribers, a dimension of the newly requested network slice, a lifespan of the newly requested network slice, and/or other information, such as an AF identifier, a UE address, a UE IP address, a flow description, performance criteria, such as a QoS reference, QoS parameters, a requested QoS, and the like.

Upon receiving the new network slice provisioning parameters, NF management unit 150 may calculate and determine one or more of the following provisioning values: which new NF type(s) will need to be instantiated, the number of new NF instance(s) to be instantiated, and/or a size and a geographic service location of the NF to be instantiated per NF type.

The NF management unit 150 may then send an NRF instance provisioning request 410 to COP 318. As shown, the provisioning request is for a new NRF, and in some embodiments, when a new NRF instance is being requested, the NF management unit 150 may instruct COP 318 to create the NRF first prior to creating one or more other network functions, such as UDR 314, UDM 316, NSSF 320, PCF 308, AMF 302, SMF 304, and/or UPF 306.

COP 318 may receive the provisioning request from NF management unit 150 for a new NRF and initiate an NRF instantiation procedure 415. A newly created NRF instance dedicated to the newly requested network slice is instantiated and configured (block 420). COP 318 may receive a confirmation 425 that NRF worker nodes are created, and verify that all the pods are online. COP 318 may notify NF management 150 that the NRF creation is successful 430. NF management unit 150 may receive the notification from COP 318 of the successful NRF creation for the newly requested network slice and verify configuration against the network slice provisioning request.

After successful creation of NRF 310, NF management unit 150 may proceed with the instantiation request 435 for one or more other NFs, e.g., UDR 314, UDM 316, NSSF 320, PCF 308, AMF 302, SMF 304, and/or UPF 306. In some embodiments, NF management unit 150 may inform COP 318 to configure one or more of UDR 314, UDM 316, NSSF 320, PCF 308, AMF 302, SMF 304, and/or UPF 306 to register to the newly instantiated NRF 310 that will serve the subscribers using the newly requested network slice.

COP 318 may receive the provisioning request from NF management unit 150 for creating one or more of UDR 314, UDM 316, NSSF 320, PCF 308, AMF 302, SMF 304, and/or UPF 306, and initiate an instantiation procedure 440. COP 318 may also include the newly created NRF 310 information in the instantiation configuration files. New UDR 314, UDM 316, NSSF 320, PCF 308, AMF 302, SMF 304, and/or UPF 306 instances dedicated to the newly requested network slice may be instantiated and configured (block 445).

After successful instantiation, one or more of UDR 314, UDM 316, NSSF 320, PCF 308, AMF 302, SMF 304, and/or UPF 306 may proceed to register with NRF 310 (arrows 450a-f), dedicated for the newly requested network slice. Referring to FIG. 4B, COP 318 may receive confirmation (arrows 455a-f) from one or more of UDR 314, UDM 316, NSSF 320, PCF 308, AMF 302, SMF 304, and/or UPF 306 that one or more worker nodes have been created, verify 460 that the associated pods are online, and notify NF management unit 150. NF management unit 150 may receive the notification from COP 318 of the successful NRF 310 creation for the newly provisioned network slice and verify its configuration against the corresponding provisioning request.

NF management unit 150 may query 465 NRF 310 to confirm that one or more of the newly instantiated UDR 314, UDM 316, NSSF 320, PCF 308, AMF 302, SMF 304, and/or UPF 306, serving the newly instantiated network slice, have been registered. NF management unit 150 may send slice specific subscriber provisioning data 470, included in input 130, to UDR 314 and/or UDM 316, which may query 475 NRF 310 for one or more of the newly provisioned NSSF 320, PCF 308, AMF 302, SMF 304, and/or UPF 306, serving the newly provision network slice. UDR 314 and/or UDM 316 may notify (arrows 480a-e) one or more of the newly provisioned NSSF 320, PCF 308, AMF 302, SMF 304, and/or UPF 306 with new subscriber slice entitlements (e.g., S-NNSAI, URSP, APN, and the like) for the newly provisioned network slice corresponding to the associated service/service profile.

NF management unit 150 may notify an operator associated with input 130 that the NF instances for the newly provisioned network slice are created and ready to transport data traffic in an established session with an AF 322 and/or 324 over a network (e.g., access network 210, core network 230, and/or external network 220).

Figure 5:
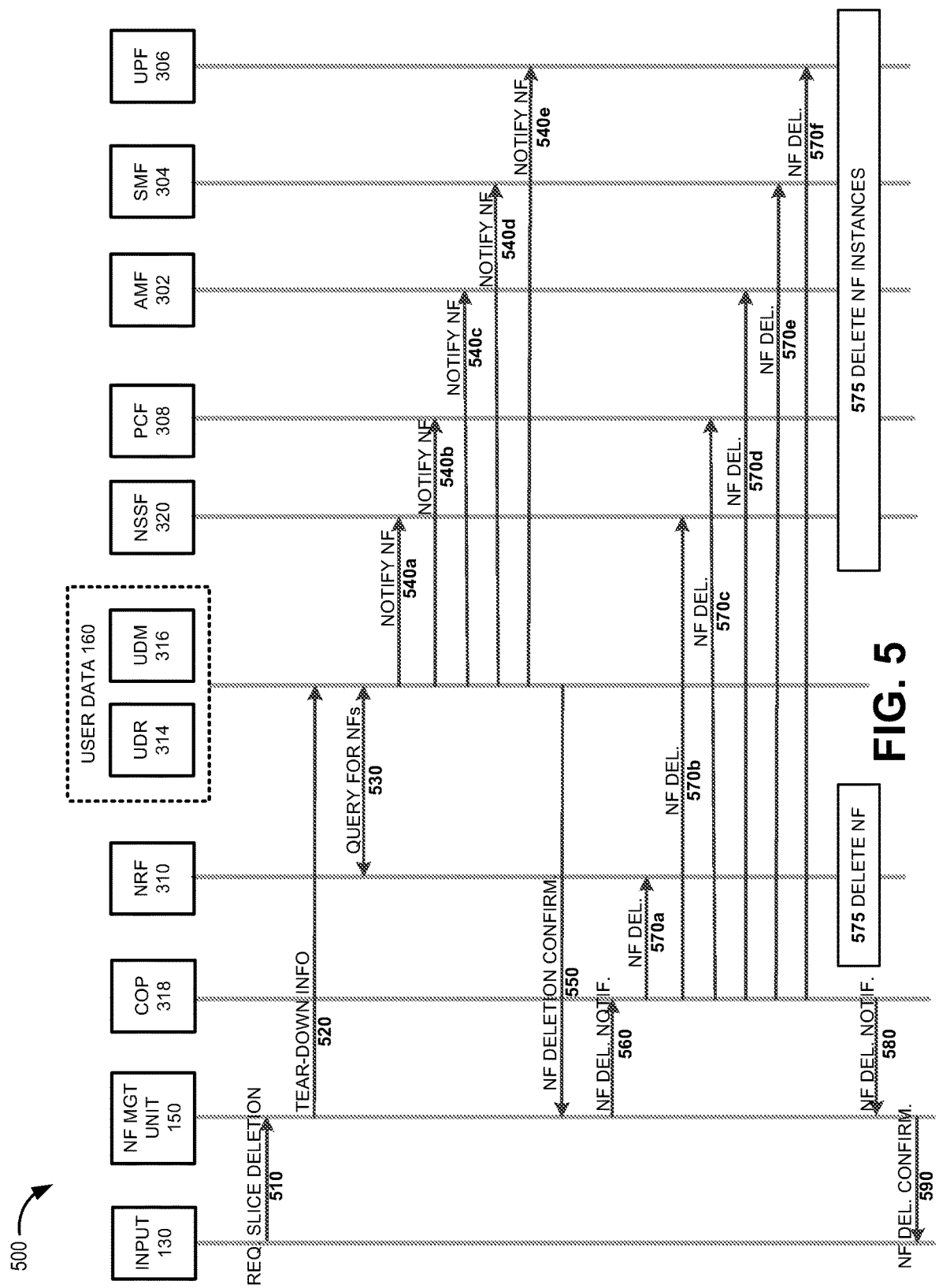
FIG. 5 shows signaling diagrams of an exemplary process that is associated with the systems and methods for supporting dynamic NF deletion and release, according to an implementation.

FIG. 5 shows a signaling diagram of an exemplary process 500 that is associated with the systems and methods for supporting dynamic network slice deletion and release, according to an implementation, and which may be performed by one or more components 302-324. Although additional network components may perform part of process 500, these components are not shown in FIG. 5. Also, FIG. 5 is not intended to illustrate every signal/message exchanged or task performed by the network components during process 500. The signaling may be in the form of a call via an interface, such as a SBI.

As shown, process 500 may include an operator associated with input 130 sending a network slice deletion request 510 to NF management unit 150. The network slice deletion request may include any of the following slice information: S-NNSAI, URSP, APN and/or list of serving NFs for an S-NSAAI.

NF management unit 150 may send network slice specific tear-down information 520 to UDR 314 and/or UDM 316. UDR 314 and/or UDM 316 may query 530 NRF 310 to determine which NFs are serving the S-NSSAI for the network device to be released. NRF 310 responds with the list of NFs registered with the S-NSAAI.

UDR 314 and/or UDM 316 may notify (arrows 540a-e) one or more of NSSF 320, PCF 308, AMF 302, SMF 304, and/or UPF 306 with network slice entitlement and deletes S-NSSAI and/or the URSP configuration. UDR 314 and/or UDM 316 may send slice entitlement deletion confirmation 550 to NF management 150. NF management unit 150 may send 560 a list of NF instances to COP 318 to initiate a corresponding tear-down procedure.

Figure 6:
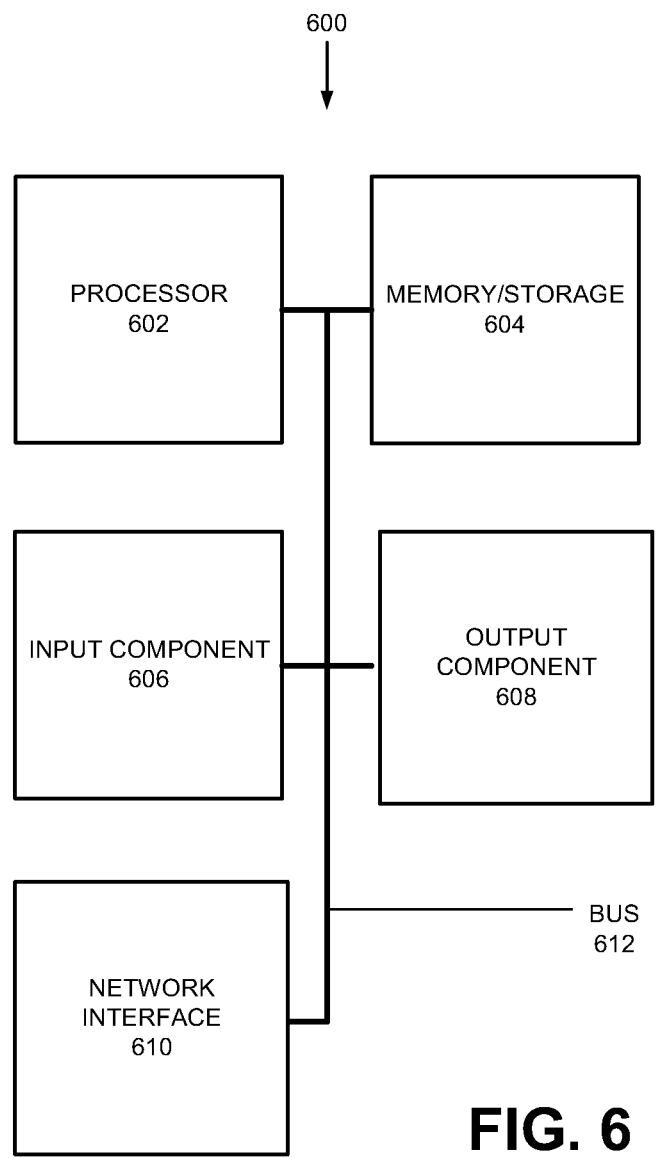
FIG. 6 depicts exemplary components of an exemplary network device according to an implementation.

COP 318 may receive the request execute the tear-down procedure (arrows 570a-e) for one or more of NSSF 320, PCF 308, AMF 302, SMF 304, and/or UPF 306. COP 318 may decommission worker nodes, delete microservice pods, and remove namespaces (block 575). After successful decommissioning, COP 318 may notify 580 NF management unit 150. which may then confirm deletion 590 to the operator associated with input 130. All or some of the deleted NF resources may be returned to a pool and made available to the cluster's resources. FIG. 6 depicts exemplary components of an exemplary network device 600. Network device 600 may correspond to or be included in any of the devices and/or components illustrated in FIGS. 1-3, 4A, 4B, and 5 (e.g., UE 110, access network 210, core network 230, external network 220, DNFM system 100, NFs 302-320, AF 322, 324, etc.). In some implementations, network devices 600 may be part of a hardware network layer on top of which other network layers and NFs may be implemented.

As shown, network device 600 may include a processor 602, a memory/storage 604, an input component 606, an output component 608, a network interface 610, and a bus 612. In different implementations, network device 600 may include additional, fewer, different, or different arrangement of components than the ones illustrated in FIG. 6. For example, network device 600 may include line cards, switch fabrics, modems, etc.

Processor 602 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 600 and/or executing programs/instructions.

Memory/storage 604 may include static memory, such as read only memory (ROM), and/or dynamic memory, such as random access memory (RAM), or onboard cache, for storing data and machine-readable instructions (e.g., programs, scripts, etc.).

Memory/storage 604 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 604 may be external to and/or removable from network device 600. Memory/storage 604 may include, for example, a Universal Serial Bus (USB) memory stick, a dongle, a hard disk, off-line storage, etc. Memory/storage 604 may also include devices that can function both as a RAM-like component or persistent storage, such as Intel® Optane memories.

Depending on the context, the terms "memory," "storage," "storage device," "storage unit," and/or "medium" may be used interchangeably. For example, a "computer-readable storage device" or "computer-readable medium" may refer to both a memory and/or storage device.

Input component 606 and output component 608 may provide input and output from/to a user to/from network device 600. Input/output components 606 and 608 may include a display screen, a keyboard, a mouse, a speaker, a microphone, a camera, a DVD reader, USB lines, and/or other types of components for obtaining, from physical events or phenomena, to and/or from signals that pertain to network device 600.

Network interface 610 may include a transceiver (e.g., a transmitter and a receiver) for network device 600 to communicate with other devices and/or systems. For example, via network interface 610, network device 600 may communicate over a network, such as the Internet, an intranet, a terrestrial wireless network (e.g., a WLAN, WiFi, WiMax, etc.), a satellite-based network, optical network, etc. Network interface 610 may include a modem, an Ethernet interface to a LAN, and/or an interface/connection for connecting network device 600 to other devices (e.g., a Bluetooth interface). Bus 612 may provide an interface through which components of network device 600 can communicate with one another.

Network device 600 may perform the operations described herein in response to processor 602 executing software instructions stored in a non-transient computer-readable medium, such as memory/storage 604. The software instructions may be read into memory/storage 604 from another computer-readable medium or from another device via network interface 610. The software instructions stored in memory/storage 604, when executed by processor 602, may cause processor 602 to perform processes that are described herein. For example, to implement NFs as described above, network device 600 may execute computer instructions that correspond to the NFs described above In the specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks and signals have been described with regard to the processes and signal flows illustrated in FIGS. 4A, 4B, and 5, the order of the blocks and signaling may be modified in other implementations. In addition, non-dependent blocks and signals may represent acts and signals that can be performed in parallel and in different order.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device comprising:
   one or more processors configured to:
   obtain user input data identifying network slice provisioning parameters for a creation of a network slice in a network;

send a request for a network repository function (NRF) instance for the network slice, to an orchestrator in the network;

receive, from the NRF instance, a verification message of the creation of the network slice;

send, to the orchestrator, a request for a creation of multiple network function (NF) instances according to the network slice provisioning parameters;

receive, from the orchestrator, a verification message of the creation of the multiple NF instances for the network slice;

receive, from the NRF, a confirmation message of a registration of the multiple NF instances for the network slice;

send slice-specific subscriber provisioning data to a user data instance provisioned for the network slice; and generate a network slice creation confirmation message identifying the network slice implemented in the network.

2. The network device of claim 1, wherein the network slice provisioning parameters include at least one of Network Slice Selection Assistance Information (S-NSSAI), user equipment route selection policies (URSPs), or an access point name (APN).

3. The network device of claim 1, wherein the network slice provisioning parameters include at least one of a type of the multiple NF instances, a forecasted number of subscribers, a dimension of the network slice, or a lifespan of the network slice.

4. The network device of claim 1, wherein the one or more processors are further configured to determine at least one of:

an NF type of the multiple NF instances, a number of the multiple NF instances, or a size and geographic service location of the multiple NF instances per NF type.

5. The network device of claim 1, wherein the one or more processors are further configured to compare the verification message against the request for an NRF instance.

6. The network device of claim 1, wherein, when sending slice-specific subscriber provisioning data, the one or more processors are further configured to send the user input data.

7. The network device of claim 1, wherein the multiple NF instances include at least one of a unified data repository (UDR) device, a unified data management (UDM) device, a user plane function (UPF), an access and management mobility function (AMF), a session management function (SMF), a network slice selection function (NSSF), or a policy control function (PCF).

8. A method comprising:

obtaining user input data identifying network slice provisioning parameters for a creation of a network slice in a network;

sending a request for a network repository function (NRF) instance for the network slice, to an orchestrator in the network;

receiving, from the NRF instance, a verification message of the creation of the network slice;

sending, to the orchestrator, a request for a creation of multiple network function (NF) instances according to the network slice provisioning parameters;

receiving, from the orchestrator, a verification message of the creation of the multiple NF instances for the network slice;

receiving, from the NRF, a confirmation message of a registration of the multiple NF instances for the network slice;

sending slice-specific subscriber provisioning data to a user data instance provisioned for the network slice; and generating a network slice creation confirmation message identifying the network slice implemented in the network.

9. The method of claim 8, wherein the network slice provisioning parameters include at least one of Network Slice Selection Assistance Information (S-NSSAI), user equipment route selection policies (URSPs), or an access point name (APN).

10. The method of claim 8, wherein the network slice provisioning parameters include at least one of a type of the multiple NF instances, a forecasted number of subscribers, a dimension of the network slice, or a lifespan of the network slice.

11. The method of claim 8, further comprising determining at least one of:

an NF type of the multiple NF instances, a number of the multiple NF instances, or a size and geographic service location of the multiple NF instances per NF type.

12. The method of claim 8, further comprising comparing the verification message against the request for an NRF instance.

13. The method of claim 8, wherein, when sending slice-specific subscriber provisioning data, the method further comprising sending the user input data.

14. The method of claim 8, wherein the multiple NF instances include at least one of a unified data repository (UDR) device, a unified data management (UDM) device, a user plane function (UPF), an access and management mobility function (AMF), a session management function (SMF), a network slice selection function (NSSF), or a policy control function (PCF).

15. A non-transitory, computer-readable storage media storing instructions, which, when executed by one or more processors of a network device, cause the network device to:

obtain user input data identifying network slice provisioning parameters for a creation of a network slice in a network;

send a request for a network repository function (NRF) instance for the network slice, to an orchestrator in the network;

receive, from the NRF instance, a verification message of the creation of the network slice;

send, to the orchestrator, a request for a creation of multiple network function (NF) instances according to the network slice provisioning parameters;

receive, from the orchestrator, a verification message of the creation of the multiple NF instances for the network slice;

receive, from the NRF, a confirmation message of a registration of the multiple NF instances for the network slice;

send slice-specific subscriber provisioning data to a user data instance provisioned for the network slice; and generate a network slice creation confirmation message identifying the network slice implemented in the network.

16. The non-transitory, computer-readable storage media of claim 15, wherein the network slice provisioning parameters include at least one of Network Slice Selection Assistance Information (S-NSSAI), user equipment route selection policies (URSPs), an access point name (APN), a type of the multiple NF instances, a forecasted number of subscribers, a dimension of the network slice, or a lifespan of the network slice.

17. The non-transitory, computer-readable storage media of claim 15, wherein the instructions further cause the network device to determine at least one of:
   an NF type of the multiple NF instances,
   a number of the multiple NF instances, or
   a size and geographic service location of the multiple NF instances per NF type.

18. The non-transitory, computer-readable storage media of claim 15, wherein the instructions further cause the network device to compare the verification message against the request for an NRF instance.

19. The non-transitory, computer-readable storage media of claim 15, wherein, to send slice-specific subscriber provisioning data, the instructions further cause the network device to send the user input data.

20. The non-transitory, computer-readable storage media of claim 15, wherein the multiple NF instances include at least one of a unified data repository (UDR) device, a unified data management (UDM) device, a user plane function (UPF), an access and management mobility function (AMF), a session management function (SMF), a network slice selection function (NSSF), or a policy control function (PCF).

* * * * *